March 25, 1958 D. W. COLE 2,828,451

CONTROL SYSTEM FOR SIGNAL SEEKING RECEIVERS

Original Filed May 7, 1947

INVENTOR.
Dana W. Cole
BY
C. G. Horton
Attorney

United States Patent Office 2,828,451

Patented Mar. 25, 1958

2,828,451

CONTROL SYSTEM FOR SIGNAL SEEKING RECEIVERS

Dana W. Cole, Buffalo, N. Y., assignor to Sylvania Electric Products Inc., a corporation of Massachusetts Continuation of abandoned application Serial No. 746,603, May 7, 1947. This application July 24, 1952, Serial No. 300,744

11 Claims. (Cl. 317—149)

Figure 1:
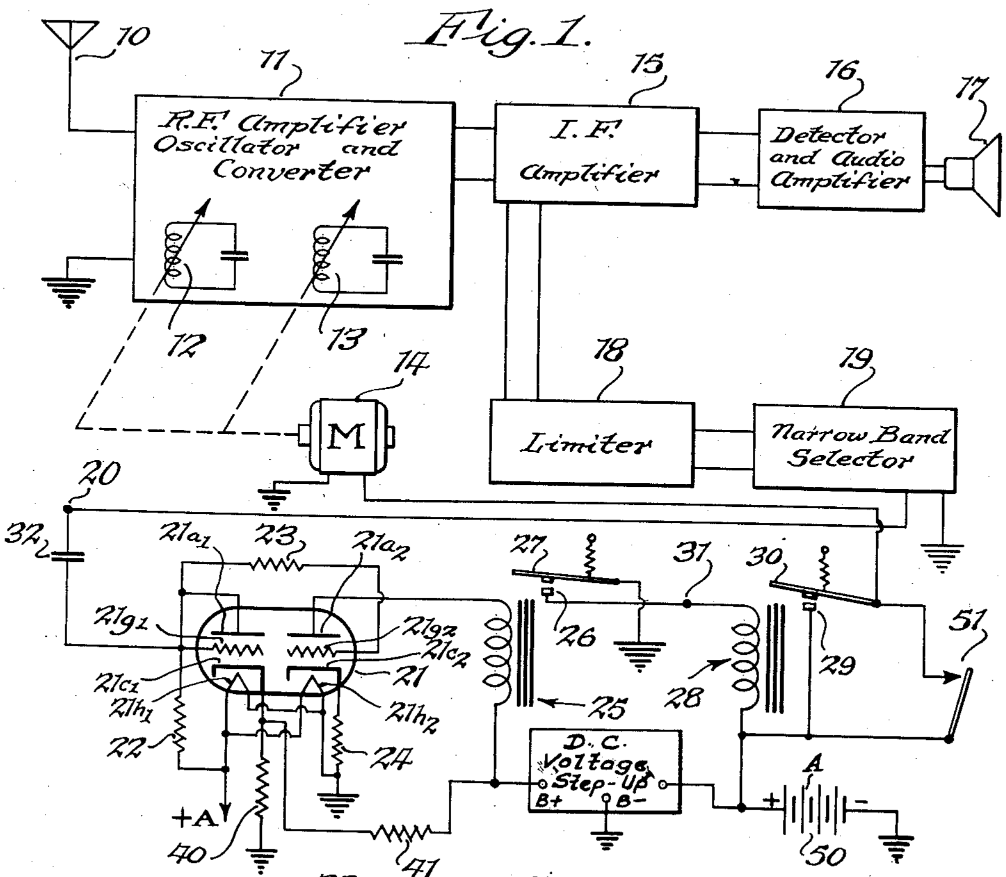

This invention relates to improvements in signal-seeking receivers, and more particularly to improvements stabilizing the relay current in signal-seeking receivers.

The present application is a continuation of abandoned application Serial No. 746,603, filed May 7, 1947, entitled "Improvements in Signal Seeking Receivers," and assigned to the same assignee as the present application.

For the purposes of this disclosure, a signal-seeking receiver, as the term is used herein, means a receiver in which the tuner is driven by some form of power drive, such, for example, as a motor, so that the receiver scans its spectrum until an incoming signal of predetermined strength is tuned in.

When the receiver reaches the frequency of the incoming signal, the scanning action is stopped by the signal itself, and the receiver will remain tuned to the signal which stopped the scanning until the operator closes the switch which starts the scanning again. In the form of receiver with which the present invention is concerned, there is provided a control tube, the plate current of which operates a sensitive relay, which in turn operates a relay in the tuner motor circuit.

Such receivers are particularly useful in automobiles, and when so used, the power for their operation is derived from the car storage battery. Because the voltage available from this battery may fluctuate between five and eight volts, both the A voltage and the B voltage (which is derived from the A voltage through a vibrator and transformer) will vary in operation.

This variation will ordinarily cause a variation in the plate current of the control tube, which may result in spurious stoppage of the scanning when the storage battery voltage is low, and excessive plate current, leading to overheating and possible burn-out of the relay actuating coil, when the storage battery voltage is high.

It is an object of this invention to provide a system of the class described, in which the relay hold-in or closing current of the control tube is maintained at or near a constant value for high values of A voltage while increasing it for low values of A voltage (except when the relay is to open in response to incoming signal), regardless of fluctuations of the A battery voltage.

It is a further object of this invention to provide a system of the class described, in which the plate or relay hold-in current does not exceed a predetermined maximum value regardless of fluctuations of the storage battery voltage.

It is a further object of this invention to provide a system of the class described, in which only a relatively small number of additional parts, of small cost, are required.

Still other objects and advantages of my invention will be apparent from the specification.

Figure 2:
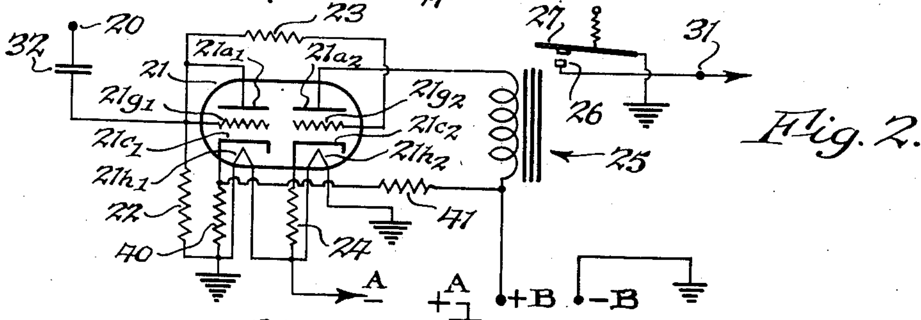
Figure 3:
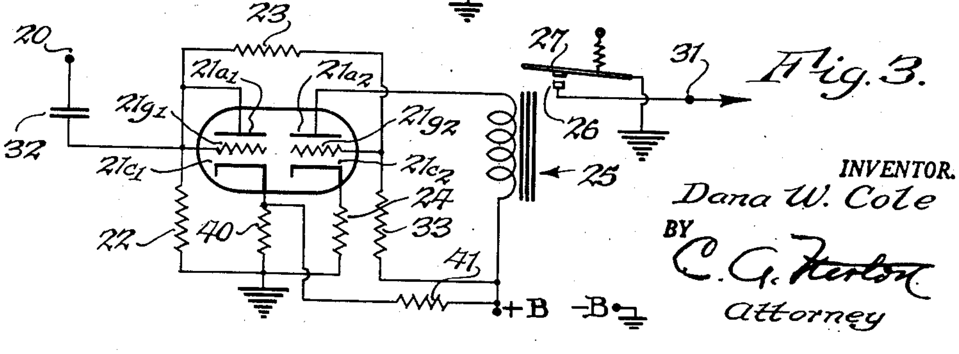

The features of novelty which I believe to be characteristic of my invention are set forth with particularity in the appended claims. My invention itself, however, both as to its fundamental principles and as to its particular embodiments, will best be understood by reference to the specification and accompanying drawing, in which:

Fig. 1 is a schematic circuit diagram of a signal-seeking receiver embodying my invention, Fig. 2 shows a modification which may be employed under certain conditions, and Fig. 3 is still an additional modification which may be employed.

Referring now more particularly to Fig. 1, 10 designates an antenna for collecting incoming signals which are supplied to the radio frequency amplifier, oscillator and converter 11, which includes variable tuned circuits 12 and 13, preferably ganged together for single control, and driven by tuner motor 14 through any suitable drive mechanism.

The output of amplifier, oscillator and converter 11 is supplied to intermediate frequency amplifier 15, thence to detector and audio amplifier 16, and finally to loud speaker or other indicator 17.

Part of the output of intermediate frequency amplifier 15 is supplied to limiter 18 and thence to narrow band selector 19, which may be a crystal bridge circuit having a band pass width of about one-tenth that of the previous circuits. For instance, if intermediate frequency amplifier 15 has a band pass width of 5,000 cycles, narrow band selector 19 will have a band pass width of the order of 500 cycles and will be tuned at or near the center of intermediate frequency amplifier pass band.

The output of the narrow band selector is supplied to terminal 20, thence through condenser 32 to control tube 21. In the form shown, tube 21 is a double triode and may be a 7F8 having a mu of about 50. The tube may comprise a pair of heaters $21h_1$ and $21h_2$, a pair of cathodes $21c_1$ and $21c_2$, a pair of control electrodes $21g_1$ and $21g_2$, and a pair of anodes $21a_1$ and $21a_2$.

Control electrode $21g_1$ and anode $21a_1$ may be connected together and to one side of condenser 32, and through resistance 22 to the +A terminal of the car storage battery 50, the negative side of which is grounded in this instance. Cathode $21c_1$ is connected to ground through resistance 40, and the common terminal of resistance 40 and cathode $21c_1$ is connected through resistance 41 to the positive side of the B source, the negative side of which is preferably grounded. The B source is a voltage step-up device such, for example, as a vibrator and a rectifier energized from the "A" battery 50. Accordingly, variations in the output voltage of the "A" battery 50 cause similar variations in the output voltage of the B source.

Anode $21a_1$ is connected through resistance 23 to control electrode $21g_2$. Cathode $21c_2$ is connected to ground through self-biasing resistor 24. Anode $21a_2$ is connected through the energizing coil of relay 25 to +B, and armature 27 is connected to ground and fixed contact 26 is connected to the actuating coil of motor circuit relay 28 and thence through car storage battery 50.

The positive side of storage battery 50 is connected to fixed contact 29 of the motor circuit relay, armature 30 of which is connected to one side of motor 14, the other side of the motor being grounded. The values of resistances 40 and 41 are so chosen that a delay bias of about 18 volts is impressed between the cathode $21c_1$, control electrode $21g_1$, and anode $21a_1$. The negative side of the B supply is grounded, as usual.

It is noted that the left-hand half of tube 21 will now operate as a diode, but will not pass current until the magnitude of the incoming signal is sufficient to overcome the effect of the delay bias. When there is insufficient signal to overcome the delay bias, control electrode $21g_2$ will tend to go slightly positive with respect to cathode $21c_2$, but flow of grid current is substantially prevented by resistor 23. The use of self-biasing resistor 24 reduces the increase of space current to anode $21a_2$ when the plate voltage rises, and this permits the use of a low current winding in relay 25.

At the same time, the connection of the heater and the heater end of resistance 22 to +A and the connection of control electrode $21g_2$ through resistances 23 and 22 to the same point, gives an increase of current for low values of the A voltage over what would otherwise be obtainable. By proper choice of these values, the constant plate current for high A voltage is maintained substantially constant, but what is more important, the plate current at low values of the A voltage is increased considerably, so that there is no danger of relay armature 27 opening or failing to close in the absence of a signal because of low battery voltage, and thus producing spurious stoppage of the tuner motor when no signal is being received, or failure to scan on closure of the manual switch to start scanning.

When a signal of sufficient strength to override the delay bias is received, it is rectified between cathode $21c_1$ and electrodes $21g_1$ and $21a_1$, producing a negative potential which is impressed through resistance 23 on control electrode $21g_2$, thereby reducing the plate current flowing through the actuating coil of relay 25 to such a point that armature 27 opens, thereby opening energizing coil of motor relay 28, permitting its armature 30 to move away from contact 29, opening the motor circuit, at which time the receiver is tuned to the incoming signal. The receiver will remain tuned to the incoming signal until the operator starts the tuning motor again, which may be done by closure of manual switch 51 parallel with motor relay contacts 29 and 30.

In case the positive side of car battery 50 is grounded, which may sometimes be the case (usually it is the negative terminal which is grounded), the negative side of car battery 50 will be connected to the common point of the heater leads, as in Fig. 2, the opposite ends of the heater leads may be grounded, and the lower end of resistor 22 may be grounded. Otherwise, the connections will be the same as in Fig. 1, and, of course, the B voltage is derived from the "A" battery.

Still another possible modification is shown in Fig. 3, in which control electrode $21g_2$ is now connected through resistance 33 to +B. This, as will be seen, provides a path to ground from +B through resistance 33, ressitance 23, and resistance 22, in series. In this case it is desirable to make the value of resistance 33 high with respect to the sum of resistances 22 and 23.

Although some improvement is obtained by the use of the circuit of Fig. 3 as compared to conventional circuits, this circuit in general is not as effective as those of Fig. 1 and Fig. 2.

By way of example, and not in limitation, the following values are given for circuits which have been found to give good results:

| | Ohms |
|---|---|
| Resistance 22 | 470,000 |
| Resistance 23 | 470,000 |
| Resistance 24 | 550 |
| Resistance 40 | 25,000 |
| Resistance 41 | 150,000 |

When my invention is not employed, I have found that for an A battery voltage of 5 volts, the B voltage is 125 volts, and plate current is 4.7 ma. For an A voltage of 8 volts, B voltage is 175, plate current 13.5 ma. The minimum desired relay closing current is 5.5 ma.

Using the circuit of my invention, the B voltages remain the same; i. e., 125 volts when the A voltage is 5 volts, and 175 volts when the A voltage is 8 volts. When A is 5 volts, the relay current is 6 ma., and when A is 8 volts, the relay current is 13.6. In the former case, the range of current for fluctuation of A voltage from 5 volts to 8 volts is 8.8 ma., while when my invention is used, the fluctuation is 7.6 ma., a difference of 1.2 ma. More significantly, it is seen that the current at low A voltage has been increased by 1.3 ma., while the current at high A voltage has been increased only 0.1 ma. Thus, it will be seen that the low A voltage current has been increased 27.6% while the high A voltage current has been increased only 0.74%.

In the specification I have explained the principles of my invention and the best mode in which I have contemplated applying those principles, so as to distinguish my invention from other inventions; and I have particularly pointed out and distinctly claimed the part, improvement, or combination which I claim as my invention or discovery.

While I have shown and described certain preferred embodiments of my invention, it will be understood that modifications and changes may be made without departing from the spirit and scope thereof, as will be clear to those skilled in the art.

What I claim is:

1. In a control circuit for effecting a control function in response to an alternating current signal, the combination of means including a low-voltage battery for energizing said control circuit, a control tube having an anode, cathode, and control electrode, a relay having an energizing coil connected in the anode-cathode circuit of said tube, means for deriving from said battery a B voltage for energizing said coil and said anode-cathode circuit, rectifier means connected to be supplied with said alternating current signal to derive from said signal when it exceeds a predetermined amplitude a unidirectional voltage of negative polarity, means for applying a delay bias of said predetermined amplitude to said rectifier, means for applying a self bias to said control tube opposing increase of plate current with increased plate voltage, means for applying the negative voltage developed by said rectifier to said control electrode with respect to said cathode, and means for connecting said battery to said rectifier and to said control tube for causing an increase in the plate current of said control tube for a decrease in the value of the voltage of said battery.

2. In a signal-seeking receiver, in combination, a radio receiver, means including a low-voltage battery for energizing said receiver, a control tube having an anode, cathode, and control electrode, a relay having an energizing coil connected in the anode-cathode circuit of said tube, means for deriving from said battery a B voltage for energizing said coil and said anode-cathode circuit, rectifier means connected to said receiver to derive from received signals exceeding a predetermined amplitude a unidirectional voltage of negative polarity, means for applying a delay bias of said predetermined amplitude to said rectifier, means for applying a self bias to said control tube opposing increase of plate current with increased plate voltage, means for applying the negative voltage developed by said rectifier to said control electrode with respect to said cathode, and means for connecting said battery to said rectifier and to said control tube for causing an increase in the plate current of said control tube for a decrease in the value of the voltage of said battery.

3. The combination claimed in claim 2, in which the negative terminal of said low voltage battery is grounded, and said last-mentioned means includes a connection between the positive terminal of said battery and the anode of said rectifier.

4. In a signal seeking receiver adapted to be energized from a source of voltage, the combination of a control means responsive to an input voltage for effecting a control function, means for energizing said control means from said source, unidirectional impedance means coupled to said receiver for deriving a first unidirectional voltage, coupling means for coupling said unidirectional impedance means to the input of said control means, means for developing a second unidirectional voltage having a polarity opposite to that of said first unidirectional voltage and having a magnitude dependent upon the magnitude of the voltage of said source, means for connecting said last-named means to said impedance means so that said second unidirectional voltage provides a delay bias for said impedance means, means for developing a second bias voltage from said source and connecting it to said unidirectional impedance means in opposition to said delay bias voltage whereby the operating characteristics of said control means are maintained relatively constant irrespective of variations in the voltage of said source.

5. In a signal-seeking receiver in combination, a radio receiver, means including a low-voltage battery for energizing said receiver, a control tube having an anode, cathode, and control electrode, a relay having an energizing coil connected in the anode-cathode circuit of said tube, means energized by said battery for providing a B voltage for energizing said anode-cathode circuit, rectifier means coupled to said receiver to derive from received signals exceeding a predetermined amplitude a unidirectional voltage of negative polarity, means for applying a delay bias of said predetermined amplitude to said rectifier, means for applying a self-bias to said control tube opposing increase of plate current thereof with increased plate voltage, means for applying the negative voltage developed by said rectifier to said control tube as a negative bias to reduce the plate current thereof with increasing amplitudes of said negative voltage, a connection from the positive terminal of said battery to ground, and a connection from the negative terminal of said battery to the cathode of said control tube, said connection including a resistance.

6. In a signal-seeking receiver in combination, a radio receiver, means including a low-voltage battery for energizing said receiver, a control tube having an anode, cathode, and control electrode, a relay having an energizing coil connected in the anode-cathode circuit of said tube, means energized by said battery for providing a B voltage for energizing said anode-cathode circuit, rectifier means coupled to said receiver to derive from received signals exceeding a predetermined amplitude a unidirectional voltage of negative polarity, means for applying a delay bias of said predetermined amplitude to said rectifier, means for applying a self bias to said control tube opposing increase of plate current thereof with increased plate voltage, means for applying the negative voltage developed by said rectifier to said control tube as a bias to reduce the plate current thereof, a connection from the negative terminal of said battery to ground, and a connection from the positive terminal of said battery to the control electrode of said control tube, said connection including series resistance of sufficient magnitude to prevent the flow of substantial grid current.

7. In a signal-seeking receiver in combination, a receiver, means including a low-voltage battery for energizing said receiver, a control tube having an anode, cathode, and control electrode, a relay having an energizing coil connected in the anode-cathode circuit of said tube, means energized by said battery for providing a B voltage for energizing said anode-cathode circuit, rectifier means coupled to said receiver to derive from received signals exceeding a predetermined amplitude a unidirectional voltage of negative polarity, means for applying a delay bias of said predetermined amplitude to said rectifier, means for applying a self bias to said control tube opposing increase of plate current thereof with increased plate voltage, means for applying the negative voltage developed by said rectifier to said control electrode with respect to said cathode, a connection from the negative terminal of said battery to ground, a connection from the control electrode of said control tube to the positive terminal of said battery, said connection including in series a resistance connected in circuit with said rectifier.

8. In a signal-seeking receiver in combination, a receiver, means including a low-voltage battery for energizing said receiver, a control tube having an anode, cathode, and control electrode, a relay having an energizing coil connected in the anode-cathode circuit of said tube, means energized by said battery for providing a B voltage for energizing said anode-cathode circuit, rectifier means coupled to said receiver to derive from received signals exceeding a predetermined amplitude a unidirectional voltage of negative polarity, means for applying a delay bias of said predetermined amplitude to said rectifier, means for applying a self bias to said control tube opposing increase of plate current thereof with increased plate voltage, means for applying the negative voltage developed by said rectifier to said control electrode with respect to said cathode, a connection from the negative terminal of said battery to ground, a connection from the control electrode of said control tube to the positive terminal of said battery, said connection including in series a resistance connected in parallel with said rectifier.

9. In a signal-seeking receiver in combination, a radio receiver, means including a low-voltage battery for energizing said receiver, a control tube having an anode, cathode, and control electrode, a relay having an energizing coil connected in the anode-cathode circuit of said tube, means energized by said battery for providing a B voltage for energizing said anode-cathode circuit, rectifier means coupled to said receiver to derive from received signals exceeding a predetermined amplitude a unidirectional voltage of negative polarity, means for applying a delay bias of said predetermined amplitude to said rectifier, means for applying a self bias to said control tube opposing increase of plate current thereof with increased plate voltage, means for applying the negative voltage developed by said rectifier to said control tube as a bias to reduce the plate current thereof, a connection from the positive terminal of said battery to ground, and a connection from the negative terminal of said battery to the cathode of said control tube through a resistance.

10. In a signal-seeking receiver in combination, a receiver, means including a low-voltage battery for energizing said receiver, a control tube having an anode, cathode, and control electrode, a relay having an energizing coil connected in the anode-cathode circuit of said tube, means energized by said battery for providing a B voltage for energizing said anode-cathode circuit, rectifier means coupled to said receiver to derive from received signals exceeding a predetermined amplitude a unidirectional voltage of negative polarity, means for applying a delay bias of said predetermined amplitude to said rectifier, means for applying a self bias to said control tube opposing increase of plate current thereof with increased plate voltage, means for applying the negative voltage developed by said rectifier to said control electrode with respect to said cathode as a bias, a source of unidirectional plate voltage, and a connection from the positive terminal of said source to the control electrode of said control tube, said connection including a dropping resistor.

11. In a signal-seeking receiver in combination, a receiver, means including a low-voltage battery for energizing said receiver, a control tube having an anode, cathode, and control electrode, means energized by said battery for providing a B voltage for energizing said anode-cathode circuit, a relay having an energizing coil connected in the anode-cathode circuit of said tube, rectifier means coupled to said receiver to derive from received signals exceeding a predetermined amplitude a unidirectional voltage of negative polarity, means for applying a delay bias of said predetermined amplitude to said rectifier, means for applying a self bias to said control tube opposing increase of plate current thereof with increased plate voltage, means for applying the negative voltage developed by said rectifier to said control electrode with respect to said cathode, a source of unidirectional plate voltage, a connection from the positive terminal of said source to ground through a path containing high resistance, and a connection from an intermediate point of said resistance to the control electrode of said control tube.

References Cited in the file of this patent

UNITED STATES PATENTS

| | | |
|---|---|---|
| 2,144,224 | Koch | Jan. 17, 1939 |
| 2,345,951 | Smith | Apr. 4, 1944 |
| 2,381,754 | Jadraque et al. | Aug. 7, 1945 |
| 2,397,088 | Clay | Mar. 26, 1946 |
| 2,434,939 | Levy | Jan. 27, 1948 |
| 2,475,613 | Hastings | July 12, 1949 |
| 2,480,842 | Farnsworth | Sept. 6, 1949 |
| 2,629,840 | Weiss | Feb. 24, 1953 |